United States Patent [19]
Shah et al.

[11] Patent Number: 5,948,881
[45] Date of Patent: Sep. 7, 1999

[54] POLYAMIDE CURING AGENTS BASED ON MIXTURES OF POLYETHYLENE-AMINES, PIPERAZINES AND DEAMINATED BIS-(P-AMINOCYCLOHEXYL) METHANE

[75] Inventors: Dilipkumar Nandlal Shah, Wescosville; William Edward Starner, Nesquehoning, both of Pa.

[73] Assignee: Air Products and Chemicals, Inc., Allentown, Pa.

[21] Appl. No.: 08/985,137

[22] Filed: Dec. 4, 1997

[51] Int. Cl.[6] .......................... C08G 69/26; C08G 69/34; C08F 5/30; C08K 8/34
[52] U.S. Cl. ...................... 528/339.3; 528/183; 528/189; 528/208; 528/339.5; 528/340; 528/342; 525/420; 525/420.5; 525/423; 525/435; 525/526; 524/100; 524/178; 524/567; 524/569
[58] Field of Search ...................... 525/526, 420, 525/423, 420.5, 135; 528/189, 183, 340, 342, 339.3, 408, 339.5; 524/100, 178, 567, 569

[56] References Cited

U.S. PATENT DOCUMENTS

| | | | |
|---|---|---|---|
| 2,450,940 | 10/1948 | Cowan et al. | 260/404.5 |
| 2,705,223 | 3/1955 | Renfrew et al. | 260/18 |
| 4,082,708 | 4/1978 | Mehta | 525/423 |
| 4,107,116 | 8/1978 | Riew et al. | 525/423 |
| 4,128,525 | 12/1978 | Yeakey et al. | 525/423 |
| 4,732,966 | 3/1988 | Wilson | 528/339.3 |
| 4,937,296 | 6/1990 | Golownia | 525/423 |
| 5,021,482 | 6/1991 | Wozniak | 524/100 |
| 5,162,490 | 11/1992 | Drawert et al. | 528/339.3 |
| 5,296,556 | 3/1994 | Firhart | 525/420.5 |
| 5,576,416 | 11/1996 | Walker | 528/340 |

FOREIGN PATENT DOCUMENTS 266519  7/1990  Czechoslovakia .

*Primary Examiner*—P. Hampton-Hightower
*Attorney, Agent, or Firm*—Michael Leach

[57] ABSTRACT

Curative compositions of amine terminated polyamide resins blended with a deaminated bis-(p-aminocyclohexyl) methane composition (DeAms) are useful for curing adhesive epoxy resin compositions. The polyamides comprise combinations of fatty mono-acids, dimer acids, polyethyleneamines, and piperazine ring containing polyamines which are piperazine or N-aminoalkylpiperazine, where the alkyl chain is a C2 to C6 alkyl chain, wherein the ratio of equivalents of fatty mono-acid to dimer acid can range from about 0.001:1 to about 1:1, the ratio of moles of piperazine ring containing polyamine to polyethylene amine can range from about 0.1:1 to about 1:1, and the ratio of moles of polyamine to equivalents of acid can range from about 0.6:1 to about 1.2:1. DeAms is blended at 2 to 40 wt % based on polyamide. Adhesive compositions comprising these curatives are also disclosed.

26 Claims, No Drawings

5,948,881

POLYAMIDE CURING AGENTS BASED ON MIXTURES OF POLYETHYLENE-AMINES, PIPERAZINES AND DEAMINATED BIS-(P-AMINOCYCLOHEXYL) METHANE

FIELD OF THE INVENTION

This invention relates to polyamide curing agents for epoxy resins useful for the preparation of adhesive products.

BACKGROUND OF THE INVENTION

Many epoxy adhesives designed for ambient and heat cure applications employ a polyamide as the curing agent, either alone or in some cases in combination with other curing agents. Polyamides comprise the reaction products of dimerized fatty acid (dimer acid) and polyethyleneamines, and usually but optionally, a monomeric fatty acid. Dimer acid is prepared by the oligomerization of certain monomeric fatty acids, usually tall oil fatty acid (TOFA), though sometimes other vegetable acids are substituted. Commercial products generally consist of mostly (>70%) dimeric species, with the rest consisting mostly of trimers and higher oligomers, along with small amounts (generally less than 5%) of monomeric fatty acids. Any of the higher polyethyleneamines can be employed in the preparation of polyamides, such as diethylenetriamine (DETA), triethylenetetramine (TETA), tetraethylenepentamine (TEPA), or pentaethylenehexamine (PEHA), though in actual commercial practice the polyethyleneamine most commonly employed is TETA.

Polyamides are employed because they allow for the formulation of adhesives with excellent flexibility, adhesion and water resistance, most likely due to the hydrophobicity imparted by the fatty nature of the starting materials. Nevertheless, there are several properties of polyamide curing agents that would benefit from improvement.

Polyamide curing agents suitable for adhesive applications have relatively high viscosity. There has been a need to reduce the viscosity of the epoxy resin binder employed in adhesives for a number of reasons. Primary reasons include ease of application and an ability to increase the amount of the fillers used in adhesive formulations. Attempts made to lower the viscosity of polyamide curing agents include employing low viscosity polyamine curing agents as well as low viscosity plasticizers and modifiers. However, these modifications adversely affect the properties of adhesives formulations which employ such materials.

U.S. Pat. No. 2,450,940 and U.S. Pat. No. 2,705,223 both describe the preparation of polyamide resins useful for curing epoxy resins by the condensation of dimerized or polymerized fatty acids with polyethyleneamines such as ethylenediamine (EDA) and DETA.

U.S. Pat. No. 5,021,482 describes the preparation of polyamides from polymerized fatty acid and a mixture of amines comprising a polyalkylene polyamine and an N-aminoalkylpiperazine, preferably N-aminoethylpiperazine (AEP). The polyamides are utilized as adhesion promoters for PVC plastisols. Because high amine content in such an adhesion promoter destroys the acid catalysts employed in top coats applied to such plastisols, this invention is directed toward the preparation of polyamides with an amine value less than about 225. In order to achieve these low amine values, the percent by weight of amines utilized is less than 30%, preferably less than 25%. Although no viscosity of the neat polyamides prepared in '482 is reported, the viscosity of the product of example 1 is 8,880 cP at 25° C., at a calculated solids of only 50%, assuming that 1 mole of water is lost for every 295 g of polymerized fatty acid in the composition. Thus, these products are very high in viscosity, and of little value in modem coatings applications, where environmental regulations require that only limited amounts of solvent can be utilized in the final coating formulation.

CS 266519 discloses an extremely broad range of polyamide resins prepared by condensing carboxylic acids (avg mol wt 146–650) with polyamines composed of 20–90% aliphatic polyamines $H_2N(CH_2CH_2NHCH_2CH_2)_{1-4}NH_2$ and 10–80% heterocyclic polyamines $H_2N(CH_2CH_2NH)_{0-4}CH_2CH_2Z(CH_2CH_2N)_{0-4}H$.

SUMMARY OF THE INVENTION

Incorporating a deaminated bis-(p-aminocyclohexyl) methane composition (DeAms) into polyamide compositions comprising the reaction products of fatty mono-acid, dimer acid, a polyethyleneamine, and a piperazine ring containing polyamine selected from the group consisting of piperazine and N-aminoalkylpiperazine yields polyamide curing agents which have significantly lower viscosities than polyamides of the current art and affords epoxy adhesive compositions with comparable adhesion. Furthermore, incorporation of these polyamide/DeAms compositions into epoxy adhesive compositions results in adhesives with faster dry speed and improved wetting relative to polyamides of the current art.

DETAILED DESCRIPTION OF THE INVENTION

The fatty mono-acids used in the current invention are those composed primarily of C12 to C22 monocarboxylic acids containing from 0 to about 4 units of unsaturation. Usually, such fatty acids will be mixtures derived from triglycerides of natural products. Pure fatty acids or mixtures of pure fatty acids, such as stearic, palmitic, oleic, linoleic, linolenic, etc. acids may also be employed, as can various esters of any of these fatty acids, particularly the $C_1$ to $C_4$ esters and triglyceride esters of glycerol and the fatty acid. Also of utility is isostearic acid, also known as monomer acid. Monomer acid is the mostly C18 fatty mono-acid stream derived from the preparation of dimer acid.

The preferred fatty acids are tall oil fatty acid and soya fatty acid. The most preferred fatty acid is tall oil fatty acid.

"Dimerized" or "dimer" or "polymerized" fatty acid refers, in a general way, to polymerized acids obtained from unsaturated fatty acids. They are described more fully in T. E. Breuer, 'Dimer Acids', in J. I. Kroschwitz (ed.), *Kirk-Othmer Encyclopedia of Chemical Technology*, 4th Ed., Wiley, New York, 1993, Vol. 8, pp. 223–237. They are prepared by polymerizing fatty acids under pressure, and then removing most of the unreacted fatty mono-acids by distillation. The final dimeric acid product usually consists of some fatty mono-acid, mostly dimeric acids, and trimeric and higher acids. The dimeric acid product can be prepared with various, controlled levels of fatty mono-acids. The ratio of dimeric acids to trimeric and higher acids is variable, depending on processing conditions and the unsaturated acid feedstock. The dimer acid may also be further processed by, for example, hydrogenation, which reduces the degree of unsaturation and the color of the product. Suitable for the purposes of the present invention are dimer acids with a mono-acid content ranging from greater than 0 to about 26 wt %, a dimer content ranging from about 30 to 97 wt %, and a trimer and higher mer content of from about 3 to 70 wt %. However, as the amount of trimer acid is increased, it will be necessary to increase the amount of polyamine and/or the amount of fatty mono-acid in order to maintain the desired viscosity of the final product, since the higher functionality of the trimeric and higher fatty acids will lead to more branching and increase of molecular weight in the product, as will be appreciated by those skilled in the art. Esters of dimer acids, particularly the $C_1$ to $C_4$ alkyl esters, can also be employed in the current invention.

Preferred dimer acids are those compositions prepared with a range of dimeric acids from 75% to 90% from, for example, the unsaturated fatty acids oleic and linoleic acids and others obtained from sources such as TOFA, soya fatty acid, rapeseed fatty acid, and the like, and most preferred are Empol 1018 and Empol 1019 dimer acids (Henkel Corp.), Sylvadym T-18 dimer acid (Arizona Chem.), and Unidyme 18 dimer acid (Union Camp).

The ratio of equivalents of fatty mono-acid in the reaction mixture to dimer acid can be varied from about 0.001:1 to about 1:1, preferably from 0.05:1 to 0.35:1, and most preferably from 0.15:1 to 0.25:1. The equivalents of acid can be obtained by titration with alcoholic hydroxide, as is well known in the art.

Although a fatty mono-acid is a required component of the reaction mixture which can be added separately, the requisite fatty mono-acid component may be present in the dimer acid component because the dimer acid component, as a result of its manufacture, will most likely contain some starting fatty mono-acid. In addition, the dimer acid may be processed to supply the requisite equivalent amount of fatty mono-acid, or optionally, supplemental fatty mono-acid may be added.

The polyethyleneamines used in the practice of the invention are those of the structure:

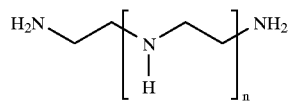

where n is an integer ranging from 1 to about 6. It will be appreciated by those skilled in the art that polyethyleneamines of commerce where n is greater than or equal to 2 are not pure products, but are mixtures that also contain substantial portions of branched and cyclic congeners, where congeners refers to species that contain the same number of heteroatoms, in this case nitrogen. Thus, TETA contains not only the linear structure with n=2 shown above, but also the branched isomer:

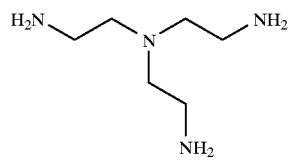

and the following two cyclic congeners:

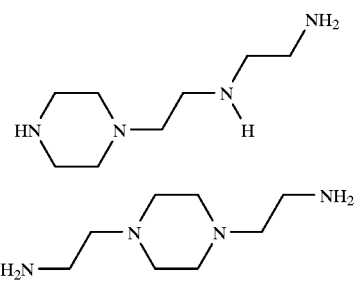

Mixtures of polyethyleneamines can be employed as well. Examples of polyethyleneamines include DETA, TETA, TEPA, PEHA, and the higher polyethyleneamines. The preferred polyethyleneamines are TETA and TEPA.

The suitable piperazine ring containing polyamines comprise piperazine and N-aminoalkylpiperazine, where the alkyl chain is a C2 to C6 alkyl chain. Preferred piperazine ring containing polyamines are piperazine and AEP. It has been discovered that condensation of AEP with carboxylic acids occurs preferentially on the primary amine, leaving only one active hydrogen for reaction with epoxy resin. If piperazine reacts on only one end with a carboxylic acid, it likewise leaves only one active hydrogen for reaction with epoxy resin. In this way, the equivalent weight of the final polyamide is increased, leading to the desirable result of reduced viscosity when formulated with high viscosity epoxy resin.

The ratio of moles of piperazine ring containing polyamine to polyethyleneamine is also crucial to the practice of this invention. As is obvious from the above, this ratio has a significant effect on the amine hydrogen equivalent weight (AHEW) of the final product. It has also been determined that adhesion to cold rolled steel (CRS) substrates after exposure to condensing humidity is improved by including piperazine ring containing polyamines in the polyamide composition. The ratio of moles of piperazine ring containing polyamine to polyethylene-amine can range from about 0.1:1 to about 1:1, preferably from 0.3:1 to 0.8:1.

The ratio of total moles of polyamine (including the piperazine ring containing polyamines) to equivalents of acid is a crucial parameter in determining the properties of the resulting polyamides. This parameter will have a large influence on the molecular weight and hence the viscosity of the polyamide produced. Indeed, if the excess of amine to acid is not large enough, then the entire composition can gel. Furthermore, this ratio also influences the AHEW of the final product, and has an effect upon the amount of unreacted polyamine present after completion of the condensation reaction. Suitable ratios of moles of polyamine to equivalents of acid range from about 0.6:1 to about 1.2:1, preferably from 0.9:1 to 1.15:1.

If desired, the composition can be optionally modified by the incorporation of additional polyethylene amine or other polyamines known in the art.

Polyamides used in the current invention can be manufactured by any number of processes known to those skilled in the art. Normally, the amines and acids are combined at temperatures ranging from about room temperature to about 100° C. Heat is then supplied to raise the temperature as water is condensed from the reaction mixture. Heating is normally continued until the specified amount of water is removed that will yield a product with the desired imidazoline and amide content. Optionally, vacuum can be applied particularly in the late stages of the process to aid in the removal of water from the mixture. To reduce foaming, which can be a problem particularly under vacuum conditions, small amounts of defoamers may be added to the polyamide composition. Appropriate defoamers include various acrylic copolymers containing 2-ethylhexyl acrylate as part of the copolymer composition, various polysiloxane copolymers, and the like.

An alternative approach to the preparation of polyamide compositions used in the polyamide/DeAms compositions of the present invention is to prepare separately one or more products using the components required for the polyamide composition described above, and then blending those separately prepared products, possibly with some of the components, to form a final mixture which falls within the guidelines given above for the ratio of equivalents of fatty mono-acid to dimer acid, the ratio of moles of piperazine ring containing polyamine to polyethyleneamine, and the ratio of total moles of polyamine to equivalents of acid.

For example, the following reaction products could be prepared by reacting variations of the individual components:

a polyethyleneamine and a dimer acid;
   a piperazine-containing polyamine and a dimer acid;
   a piperazine-containing polyamine and a fatty mono-acid;
   a polyethyleneamine and a fatty mono-acid;
   a polyethyleneamine, a piperazine-containing polyamine and a dimer acid;
   a polyethyleneamine, a piperazine-containing polyamine and a fatty mono-acid;
   a polyethyleneamine, a piperazine-containing polyamine, a dimer acid and a fatty mono-acid;
   a polyethyleneamine, a dimer acid and a fatty mono-acid; and
   a piperazine-containing polyamine, a dimer acid and a fatty mono-acid;

These reaction products could then be blended within certain ranges, with or without the addition of one or more of the individual components, to form compositions falling within the scope of this invention. The process for the preparation of the polyamides used in the present invention described above can also be employed for the preparation of the reaction products listed above that are further blended.

The DeAms component which is blended into the above described polyamide composition is a deaminated bis-(p-aminocyclohexyl)methane composition comprising the compound 4-(methylcyclohexyl)cyclohexylamine, which compound can be prepared according to the disclosure in U.S. Pat. No. 3,981,766 which is hereby incorporated by reference. DeAms can also be prepared as a byproduct in the hydrogenation of methanedianiline (MDA) over a noble metal catalyst in the production of bis-(p-aminocyclohexyl) methane (PACM) and can be obtained from the forecut distillation fraction from the PACM purification. The distillation fraction of DeAms is typically a complex mixtures of amine-containing materials, for example, 25 to 40 wt % 4-(methylcyclohexyl)cyclohexylamine, 30 to 45 wt % PACM and 15 to 25 wt % perhydrodibenzopyridine. The DeAms composition used in the following examples was a distillation fraction and comprised the materials (as determined by gas chromatography) show in Table A.

TABLE A

| Component | Chemical structure | Area % |
|---|---|---|
| 1 | 4-(methylcyclohexyl)-cyclohexylamine DeAms | 32.28 |
| 2 | 4-(benzyl)cyclohexylamine | 5.63 |
| 3 | bis-(p-aminocyclohexyl) methane | 36.19 |
| 4 | perhydrodibenzopyridine | 20.35 |
| 5 | Other unidentified amines and hydrocarbons | 5.56 | the amount of DeAms used in the present invention is 2 to 40 wt %, preferably 10 to 25 wt % amount of the polyamide composition.

To form the adhesive compositions of the invention the polyamide/DeAms hardner composition is combined with an epoxy resin which is a polyepoxy compound containing more than one 1,2-epoxy groups per molecule. Such epoxides are well known in the epoxy coating art and are described in Y. Tanaka, "Synthesis and Characteristics of Epoxides", in C. A. May, ed., Epoxy Resins Chemistry and Technology (Marcel Dekker, 1988). Examples include those epoxides disclosed in U.S. Pat. No. 5,599,855 Columns 5/6 to 6/20. The preferred polyepoxy compounds are the diglycidyl ethers of bisphenol-A and the diglycidyl ethers of bisphenol-F, and blends of DGEBA or DEGBF with either the advanced diglycidyl ethers of Bisphenol-A or the epoxy novolac resins.

Suitable epoxy resins for making the adhesive compositions include DER 331 resin (Dow Chemical Co.) and Epon 828 resin (diglycidyl ether of bis phenol A, EEW=190; Shell Chemical Co.). A general formulation for an adhesive epoxy composition would comprise the following components (parts by weight):

| EPOXY ADHESIVE COMPOSITION | | | |
|---|---|---|---|
| Epoxy Portion | | Curative Portion | |
| DEGBA type liquid resin | 50–100 | Polyamide composition | 50–100 |
| Modifiers | 0–20 | Other amines | 0–30 |

EPOXY ADHESIVE COMPOSITION

| Epoxy Portion | | Curative Portion | |
|---|---|---|---|
| Diluent | 0–20 | Accelerator | 0–10 |
| Fillers | 0–50 | Fillers | 0–50 |

Modifiers are used to improve adhesion, diluents to lower viscosity, other amines to alter performance properties, accelerators to increase cure rate and fillers to provide paste type consistency and lower the cost.

To reduce the viscosity of a given formulation of polyamide/DeAms used in the present invention with a more-than-one-functional epoxy resin, the epoxy resin may be modified with a portion of monofunctional and/or difunctional epoxide. In this way viscosity is further reduced, which may be advantageous in certain cases, such as for example to increase the level of filler in a formulation while still allowing easy application, or to allow the use of a higher molecular weight epoxy resin. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, 2-ethylhexanol, and C8 to C14 alcohols and the like.

The epoxy curing agent compositions according to the present invention comprising DeAms and polyamide would normally be formulated with epoxy resins at stoichiometric ratios of epoxy groups to amine hydrogen ranging from about 1.5 to 1 to about 1 to 1.5. More preferred are ranges from 1.2 to 1 to 1 to 1.2, and most preferred are 1.1 to 1 to 1 to 1.1.

In some circumstances it may be advantageous to incorporate so-called accelerators for the epoxy-amine curing reaction in formulations based on polyamides and DeAms according to the current invention. Such accelerators are described in H. Lee and K. Neville, *Handbook of Epoxy Resins,* McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis (dimethylaminomethyl)phenol, and tris (dimethylaminomethyl)phenol. Normally, such accelerators are used at levels of 10% or less based on the total weight of binder, and more usually at levels of less than 5%.

In some circumstances in may be advantageous to incorporate plasticizers for the epoxy-amine network. This is particularly useful in cases where, in the absence of such a plasticizer, the glass transition temperature, Tg, of the composition significantly exceeds the ambient temperature before the degree of reaction necessary to meet certain requirements such as solvent and chemical resistance and tensile strength has been achieved. Such plasticizers are well known to those skilled in the art, and are described more fully in D. F. Cadogan and C. J. Howick, 'Plasticizers', in J. I. Kroschwitz, ed., *Kirk-Othmer Encyclopedia of Chemical Technology,* 4th Ed., Wiley, New York, 1996, Vol. 19, pp. 258–290. Particularly useful plasticizers include benzyl alcohol, nonylphenol, and various esters of phthalic acid. The ester plasticizers would normally be incorporated in the same package as the epoxy resin to minimize reaction with the amine curing agent.

Adhesive compositions comprising a curing agent of polyamide/DeAms according to the current invention and epoxy resins can be formulated with a wide variety of ingredients well known to those skilled in the art of coating formulation, including solvents, fillers, pigments, pigment dispersing agents, rheology modifiers, thixotropes, flow and leveling aids, defoamers, etc. Mixtures of solvents will frequently be chosen so as to give the best evaporation rate profile for the system while maintaining solubility of the binder components. Suitable solvents include aromatics, aliphatics, esters, ketones, ethers, alcohols, glycols, glycol ethers, and the like. Particularly useful in the formulation are some level of ketones such as acetone, methyl ethyl ketone, methyl isoamyl ketone, methyl propyl ketone, methyl amyl ketone, diacetone alcohol and the like, which can be used to improve pot life with little or no sacrifice in dry speed. If ester solvents are included in the formulation, it is usually necessary to formulate them in the package containing the epoxy resin, so as to minimize their reaction with the amine curing agent.

Adhesives of this invention can be applied by any number of techniques including meter mix dispensing, spray, brush, roller, paint mitt, and the like. Numerous substrates are suitable for application of the adhesives with proper surface preparation, as is well understood in the art. Such substrates include but are not limited to many types of metal, particularly steel and aluminum, as well as concrete wood and PVC.

The adhesives of this invention can be applied and cured at ambient temperatures ranging from about 0° C. to about 50° C., with temperatures of 10° C. to 40° C. preferred. If desired, these adhesives can also be force cured at temperatures up to 100° C. or more.

EXAMPLES 1–4

These examples show the preparation of suitable polyamides for the practice of this invention.

The reactants as described in Table 1 were charged to a 1000 mL 4 necked round bottom flask equipped with a mechanical stirrer, thermometer, Dean-Stark distillate collection apparatus, nitrogen purge line and heating mantle. Upon mixing the reactants an exotherm was observed ranging from 60–100° C. depending on the reactant ratio used. The reaction mixture was then slowly heated to distill off the water from the condensation reaction. At about 160° C. water began to distill from the reaction mixture. Heating was continued until the temperature of the reaction mixture reached 250° C. At this point heating was stopped and the reaction mixture was cooled to room temperature and the product collected. The product yields are shown in Table 1 as well as the calculated amine hydrogen equivalent weight and the product viscosity. The amine hydrogen equivalent weight (AHEW) was calculated using the following formula:

$$AHEW = \frac{\text{Product Weight}}{[\text{Initial equiv. amine hydroger} - (2 \times \text{equiv. acid}) - \text{equiv. imidazoline formed}]}$$

where:
Equivalents of imidazoline–moles of water produced—theoretical moles of water for amide

EXAMPLE 5

This example shows an alternate preparation of a suitable polyamide mixture for the practice of this invention in contrast to the procedure of Examples 1–4 in which all the reactants were mixed together and reacted. In this case two separately prepared polyamide reaction products are blended.

A. The reactants, 1110 g of tall oil fatty acid (TOFA) and 503 g of aminoethylpiperazine (AEP), were charged to a 2000 ml 4 necked round bottom flask equipped as in Examples 1–4. Upon mixing the reactants an exotherm was observed raising the reaction temperature to 120° C. The reaction mixture was then slowly heated to distill off the water from the condensation reaction. At about 160° C. water began to distill from the reaction mixture. Heating was continued until the temperature of the reaction mixture reached 207° C. at which point the reaction mixture had an acid value of 2.4 mg KOH/g. At this point 80.38 g of water had been collected. The heating was stopped and the reaction mixture was cooled to room temperature. The polyamide product collected weighed 1531.5 g, had a Gardner color of 9, a free AEP content of 3.07 wt %, a viscosity of 404 cps at 25° C. and an AHEW of 340.

B. The reactants, 41 g of tall oil fatty acid (TOFA), 643 g of dimer acid and 316 g of triethylenetetramine (TETA), were charged to a 2000 ml 4 necked round bottom flask equipped as in Examples 1–4. Upon mixing the reactants an exotherm was observed raising the reaction temperature to 120° C. The reaction mixture was then slowly heated to distill off the water from the condensation reaction. At about 160° C. water began to distill from the reaction mixture. Heating was continued until the temperature of the reaction mixture reached 200° C. at which point the pressure was reduced to −27 inch (75 mm) Hg. Heating was continued until the imidazoline to amide ratio (IR ratio) of the reaction mixture reached 1.5. (The IR ratio is determined by infrared spectroscopy using the % transmission mode and is typically reported as IR ratio. The peak height of the imidazoline band at 1600 $cm^{-1}$ divided by the peak height of the amide I band at 1670 $cm^{-1}$ determines the IR ratio.) The heating was stopped and the reaction mixture was cooled to room temperature. The polyamide product collected weighed 941.5 g, had a Gardner color of 7, a viscosity of 38,000 cps at 25° C. and an AHEW of 120.

The reaction products of 5A and 5B were mixed together in a 25:75 weight ratio, respectively, giving the combination described as Example 5 in Table 1

TABLE 1

| Example No. | 1 | 2 | 3 | 4 | 5 |
|---|---|---|---|---|---|
| Ratios | | | | | |
| Amine/Acid (mol/eq) | 0.95 | 1.17 | 1.10 | 0.99 | 0.02 |
| Amine Ratio (mole/mole) | 0.35 | 0.43 | 0.5 | 0.6 | 0.31 |
| TOFA/Dimer (equiv/equiv) | 0.34 | 0.29 | 0.22 | 0.19 | 0.42 |
| Reactants (total) | | | | | |
| Dimer Acid[a] (g) | 245.7 | 295.0 | 295.0 | 295.0 | 295.0 |
| TOFA[b] (g) | 101.0 | 84.8 | 66.4 | 56.05 | 123.0 |
| AEP[c] (g) | 37.3 | 55.3 | 58.1 | 56.99 | 39.7 |
| TETA[d] (g) | 120.7 | 156.6 | 131.5 | 107.50 | 144.9 |
| Properties | | | | | |
| Product Yield (g) | 470.2 | 558.2 | 520.1 | 486.09 | — |
| Product AHEW | 155.2 | 124.3 | 138.1 | 165.4 | 143.7 |
| Product viscosity (cps) | 7,590 | 10,100 | 14,680 | 34,000 | — |

[a]Sylvadym T-18 dimer acid comprising 2 wt % mono-acid and 83 wt % dimer acid; eq wt = 295 (Arizona Chemical)
[b]Acintol FA-2 fatty mono-acid; eq wt = 295 (Arizona Chemical)
[c]mol wt = 129
[d]mol wt = 146

EXAMPLES 6–11

The polyamide compositions prepared in Examples 1–4 were mixed with DeAms (AHEW-74) in a 82/18 w/w ratio and Example 5 was mixed with DeAms in a 80/20 w/w ratio using the weights shown in Table 2. The mixtures were stirred for one hour to insure complete mixing. The resulting products had the viscosities and AHEW shown in Table 2. Example 11 (control) shows the viscosity of a standard polyamide (Ancamide 350A curative) used in adhesive applications.

TABLE 2

| Example No. | 6 | 7 | 8 | 9 | 10 | 11 |
|---|---|---|---|---|---|---|
| Blend Composition | | | | | | |
| Curative Example | 1 | 2 | 3 | 4 | 5 | 350A |
| Curative (g) | 470.2 | 82.0 | 328.0 | 82.0 | 80.0 | |
| DeAms (g) | 108.0 | 18.0 | 72 | 18.0 | 20.0 | |
| Product Properties | | | | | | |
| Yield (g) | 578.2 | 100.0 | 400.0 | 100.0 | 100.0 | |
| AHEW | 107.5 | 110.6 | 125.4 | 140.5 | 120.6 | 100.0 |
| Viscosity (cps) | 4500 | 3600 | 5800 | 8300 | 3900 | 11,000 |

EXAMPLES 12–17

The curative blends prepared in Examples 6–10 and the control curative in Example 11 were combined with fillers to prepare curative portions. In addition, diglycidyl ether of bis-phenol A (Epon 828 resin) and fillers were combined to prepare an epoxy portion. A stoichiometric amount of each of the curative portions was mixed with the epoxy portion and tested for adhesion to phosphate treated cold rolled steel. Table 3 describes the formulations as well as results in terms of shear strength and peel strength. The shear test and the peel test were performed according to the protocol described in ASTM D-1002 and ASTM D-1876.

The data in Table 3 shows that adhesive compositions of Examples 12–16 which employed the curative blend prepared in Examples 6–10, respectively, demonstrated equivalent or better performance than the control (Example 17) which employed a standard polyamide curing agent having significantly higher viscosity than the curative blends prepared in Examples 6–10.

TABLE 3

| Example No. | 12 | 13 | 14 | 15 | 16 | 17 |
|---|---|---|---|---|---|---|
| Curative Portion | | | | | | |
| Curative Blend Example | 6 | 7 | 8 | 9 | 10 | 11 |
| Curative Blend (g) | 50 | 50 | 50 | 50 | 50 | 50 |
| Aluminum powder (filler) | 22 | 22 | 22 | 22 | 22 | 22 |
| Talc (filler) | 27 | 27 | 27 | 27 | 27 | 27 |
| Fumed silica | 1 | 1 | 1 | 1 | 1 | 1 |
| Epoxy Portion | | | | | | |
| Epon 828 (g) | 60 | 60 | 60 | 60 | 60 | 60 |
| Talc (filler) | 38 | 38 | 38 | 38 | 38 | 38 |
| Fumed silica | 2 | 2 | 2 | 2 | 2 | 2 |
| Mix ratio, Epoxy:Curative | 100:76 | 100:79 | 100:70 | 100:89 | 100:76 | 100:76 |
| Properties | | | | | | |
| Lap Shear after 30 min. @ 150° C.; Tested @ 25° C. (PSI) | 2660 | 2670 | 2750 | 2870 | — | 2300 |
| Peel Test after 30 min. @ 150° C. Tested @ 25° C. (PLI) | 14 | 17 | 15 | 15 | — | 14 |
| Lap Shear after 7 days @ 25° C.; Tested @ 25° C. (PSI) | 2450 | 2490 | 1580 | 1870 | 2140 | 2050 |
| Peel Test after 7 days @ 25° C.; Tested @ 25° C. (PLI) | 11 | 10.5 | 12 | 12 | 11 | 11 |

STATEMENT OF INDUSTRIAL APPLICATION

The invention provides polyamide/DeAms curing agent compositions for epoxy resin adhesive compositions.

We claim:

1. An epoxy hardener composition for adhesive compositions comprising
   (A) the reaction product of a mixture comprising
      (a) a fatty mono-acid,
      (b) a dimer acid,
      (c) a polyethylene amine, and
      (d) a piperazine-containing polyamine which is piperazine or N-amino-(C2–C6)-alkylpiperazine, reacted in the following ratios:
         (1) 0.001–1:1 equivalents of fatty mono-acid per equivalents dimer acid;
         (2) 0.1–1:1 moles of piperazine-containing polyamine per mole of polyethyleneamine; and
         (3) 0.6–1.2:1 moles of total polyamines per equivalents of total acid, and (B) 2 to 40 wt % of a deaminated bis-(p-aminocyclohexyl)methane composition comprising 4-(methylcyclohexyl) cyclohexylamine, based on (A).

2. The epoxy hardener composition of claim 1 in which the fatty mono-acid is tall oil fatty acid and/or soya fatty acid.

3. The epoxy hardener composition of claim 1 in which the dimer acid is 75 to 90 wt % dimeric acids.

4. The epoxy hardener composition of claim 1 in which the polyethylene amine is triethylenetetramine and/or tetraethylenepentamine.

5. The epoxy hardener composition of claim 1 in which the piperazine-containing polyamine is piperazine and/or aminoethylpiperazine.

6. The epoxy hardener composition of claim 1 in which 0.05–0.35:1 equivalents of fatty mono-acid per equivalents dimer acid are reacted.

7. The epoxy hardener composition of claim 1 in which 0.3–0.8:1 moles of piperazine-containing polyamine per mole of polyethyleneamine are reacted.

8. The epoxy hardener composition of claim 1 in which 0.9–1.15:1 moles of total polyamines per equivalents of total acid are reacted.

9. The epoxy hardener composition of claim 1 in which the fatty mono-acid is tall oil fatty acid and/or soya fatty acid, the dimer acid is 75 to 90 wt % dimeric acids, the polyethylene amine is triethylenetetramine and the piperazine-containing polyamine is aminoethylpiperazine.

10. The epoxy hardener composition of claim 1 in which the deaminated bis-(p-aminocyclohexyl)methane composition comprises a 25 to 40 wt % 4-(methylcyclohexyl) cyclohexylamine, 30 to 45 wt % bis-(p-aminocyclohexyl) methane and 15 to 25 wt % perhydrodibenzopyridine.

11. An epoxy hardener composition for adhesive compositions comprising
   (A) the reaction product of a mixture comprising
      (a) a fatty mono-acid,
      (b) a dimer acid,
      (c) a polyethylene amine, and
      (d) a piperazine-containing polyamine which is piperazine or N-amino-(C2–C6) alkylpiperazine, reacted in the following ratios:
         (1) 0.05–0.35:1 equivalents of fatty mono-acid per equivalents dimer acid;
         (2) 0.3–0.8:1 moles of piperazine-containing polyamine per mole of polyethyleneamine; and
         (3) 0.9–1.15:1 moles of total polyamines per equivalents of total acid, and (B) 10 to 25 wt % of a deaminated bis-(p-aminocyclohexyl)methane composition comprising 4-(methylcyclohexyl) cyclohexylamine, based on (A).

12. The epoxy hardener composition of claim 11 in which the fatty mono-acid is tall oil fatty acid and/or soya fatty acid.

13. The epoxy hardener composition of claim 11 in which the dimer acid is 75 to 90 wt % dimeric acids.

14. The epoxy hardener composition of claim 11 in which the polyethylene amine is triethylenetetramine and/or tetraethylenepentamine.

15. The epoxy hardener composition of claim 11 in which the piperazine-containing polyamine is piperazine and/or aminoethylpiperazine.

16. The epoxy hardener composition of claim 11 in which the fatty mono-acid is tall oil fatty acid and/or soya fatty acid, the dimer acid is 75 to 90 wt % dimeric acids, the polyethylene amine is triethylenetetramine and/or tetraethylenepentamine and the piperazine-containing polyamine is piperazine and/or aminoethylpiperazine.

17. The epoxy hardener composition of claim 11 in which the dimer acid is 75 to 90 wt % dimeric acids, the polyethylene amine is triethylenetetramine, the piperazine-containing polyamine is aminoethylpiperazine and the deaminated bis-(p-aminocyclohexyl)methane composition comprises a 25 to 40 wt % 4-(methylcyclohexyl) cyclohexylamine, 30 to 45 wt % bis-(p-aminocyclohexyl) methane and 15 to 25 wt % perhydrodibenzo-pyridine.

18. The epoxy hardener composition of claim 11 in which 0.15–0.25:1 equivalents of fatty mono-acid per equivalents dimer acid are reacted.

19. The epoxy hardener composition of claim 17 in which 0.15–0.25:1 equivalents of fatty mono-acid per equivalents dimer acid are reacted.

20. An epoxy hardener composition for adhesive compositions comprising
- (A) two or more components selected from the group consisting of
  - (a) a fatty mono-acid,
  - (b) a dimer acid,
  - (c) a polyethylene amine,
  - (d) a piperazine-containing polyamine which is piperazine or N-amino-(C2–C6)-alkylpiperazine,
  - (e) the reaction product of a polyethyleneamine and a dimer acid;
  - (f) the reaction product of a piperazine-containing polyamine which is piperazine or N-amino-(C2–C6)-alkylpiperazine and a dimer acid;
  - (g) the reaction product of a piperazine-containing polyamine which is piperazine or N-amino-(C2–C6)-alkylpiperazine and a fatty mono-acid;
  - (h) the reaction product of a polyethyleneamine and a fatty mono-acid;
  - (i) the reaction product of a polyethyleneamine, a piperazine-containing polyamine which is piperazine or N-amino-(C2–C6)-alkylpiperazine and a dimer acid;
  - (j) the reaction product of a polyethyleneamine, a piperazine-containing polyamine which is piperazine or N-amino-(C2–C6)-alkylpiperazine and a fatty mono-acid;
  - (k) the reaction product of a polyethyleneamine, a piperazine-containing polyamine which is piperazine or N-amino-(C2–C6)-alkylpiperazine, a dimer acid and a fatty mono-acid;
  - (l) the reaction product of a polyethyleneamine, a dimer acid and a fatty mono-acid; and
  - (m) the reaction product of a piperazine-containing polyamine which is piperazine or N-amino-(C2–C6)-alkylpiperazine, a dimer acid and a fatty mono-acid; in amounts sufficient to provide the following ratios:
    - (1) 0.001–1:1 equivalents of fatty mono-acid per equivalents dimer acid;
    - (2) 0.1–1:1 moles of piperazine-containing polyamine per mole of polyethyleneamine; and
    - (3) 0.6–1.2:1 moles of total polyamines per equivalents of total acid, and (B) 2 to 40 wt % of a deaminated bis-(p-aminocyclohexyl)methane composition comprising 4-(methylcyclohexyl) cyclohexylamine, based on (A).

21. The epoxy hardener composition of claim 20 in which the ratios are
- (1) 0.05–0.35:1 equivalents of fatty mono-acid per equivalents dimer acid;
- (2) 0.3–0.8:1 moles of piperazine-containing polyamine per mole of polyethyleneamine; and
- (3) 0.9–1.15:1 moles of total polyamines per equivalents of total acid; and
- (B) is 10 to 25 wt % deaminated bis-(p-aminocyclohexyl) methane composition, based on (A).

22. The epoxy hardener composition of claim 20 in which the fatty mono-acid is tall oil fatty acid and/or soya fatty acid, the dimer acid is 75 to 90 wt % dimeric acids, the polyethylene amine is triethylenetetramine and/or tetraethylenepentamine and the piperazine-containing polyamine is piperazine and/or aminoethylpiperazine.

23. The epoxy hardener composition of claim 22 in which the deaminated bis-(p-aminocyclohexyl)methane composition comprises a 25 to 40 wt % 4-(methylcyclohexyl) cyclohexylamine, 30 to 45 wt % bis-(p-aminocyclohexyl) methane and 15 to 25 wt % perhydrodibenzopyridine.

24. An adhesive composition comprising a polyepoxide resin and the epoxy hardener composition of claim 1.

25. An adhesive composition comprising a polyepoxide resin and the epoxy hardener composition of claim 11.

26. An adhesive composition comprising a polyepoxide resin and the epoxy hardener composition of claim 20.

* * * * *